United States Patent
Manabe et al.

(10) Patent No.: US 6,594,547 B2
(45) Date of Patent: Jul. 15, 2003

(54) BAGGAGE MANAGING SYSTEM IN AIRPORT

(75) Inventors: Toshiyuki Manabe, Hokkaido (JP); Kiyoshi Kaneko, Hokkaido (JP); Toshihiko Nakajima, Hokkaido (JP)

(73) Assignee: Hudson Soft Co., Ltd., Hokkaido (JP)

(*) Notice: Subject to any disclaimer, the term of this patent is extended or adjusted under 35 U.S.C. 154(b) by 0 days.

(21) Appl. No.: 09/826,859

(22) Filed: Apr. 6, 2001

(65) Prior Publication Data

US 2001/0032034 A1 Oct. 18, 2001

(30) Foreign Application Priority Data

Apr. 12, 2000 (JP) ........................... 2000-111303

(51) Int. Cl.[7] .............................................. G06F 7/00
(52) U.S. Cl. .................................. 700/227; 700/225
(58) Field of Search ............................. 700/213, 225, 700/226, 227; 705/5

(56) References Cited

U.S. PATENT DOCUMENTS

| | | | | |
|---|---|---|---|---|
| 4,711,994 A | * | 12/1987 | Greenberg | 235/375 |
| 4,776,464 A | * | 10/1988 | Miller et al. | 209/3.3 |
| 4,984,156 A | * | 1/1991 | Mekata | 156/350 |
| 5,051,565 A | * | 9/1991 | Wolfram | |
| 5,225,990 A | * | 7/1993 | Bunce et al. | 700/226 |
| 5,401,944 A | * | 3/1995 | Bravman et al. | 235/375 |
| 5,478,991 A | * | 12/1995 | Watanabe et al. | 235/375 |
| 5,793,639 A | * | 8/1998 | Yamazaki | 235/375 |
| 5,866,888 A | * | 2/1999 | Bravman et al. | 235/375 |
| 5,920,053 A | * | 7/1999 | DeBrouse | 235/375 |
| 6,030,655 A | * | 2/2000 | Hansmire et al. | 427/1 |
| 6,036,348 A | * | 3/2000 | Miura | 235/375 |
| 6,044,353 A | * | 3/2000 | Pugliese, III | 235/375 |
| 6,108,636 A | * | 8/2000 | Yap et al. | 705/5 |
| 6,127,917 A | * | 10/2000 | Tuttle | |
| 6,137,895 A | * | 10/2000 | Al-Sheikh | |
| 6,158,658 A | * | 12/2000 | Barclay | |

FOREIGN PATENT DOCUMENTS

| | | |
|---|---|---|
| EP | 0 408 809 | 1/1991 |
| EP | 0 520 455 | 12/1992 |

* cited by examiner

*Primary Examiner*—Khoi H. Tran
(74) *Attorney, Agent, or Firm*—Antonelli, Terry, Stout & Kraus, LLP

(57) ABSTRACT

A baggage managing system for removing a non-boarding passenger's baggage rapidly from a plane even if a passenger checks plural pieces of baggages and improving the convenience of passengers without rise in costs. A clerk inputs the number of baggages 1, operating a baggage numbers input unit 41. A boarding pass read/write unit 40 reads boarding information including passenger's ID and flight number from a boarding pass 9 and generates baggage ID in accordance with the baggage numbers and the boarding information. A tag issuing unit 42 issues a tag 10 having recorded the passenger's ID and the baggage ID. The tag 10 is attached to the baggage 1 and read by a tag and container reading device 8. When a passenger P passes a gate 5, a boarding pass reading device 6 reads the boarding information from the boarding pass 9. The boarding information and the baggage ID etc. are recorded in databases 2A and 2B. A host computer 3 specifies a container 12 storing a non-boarding passenger's baggage in accordance with the information recorded in the databases 2A and 2B.

21 Claims, 3 Drawing Sheets

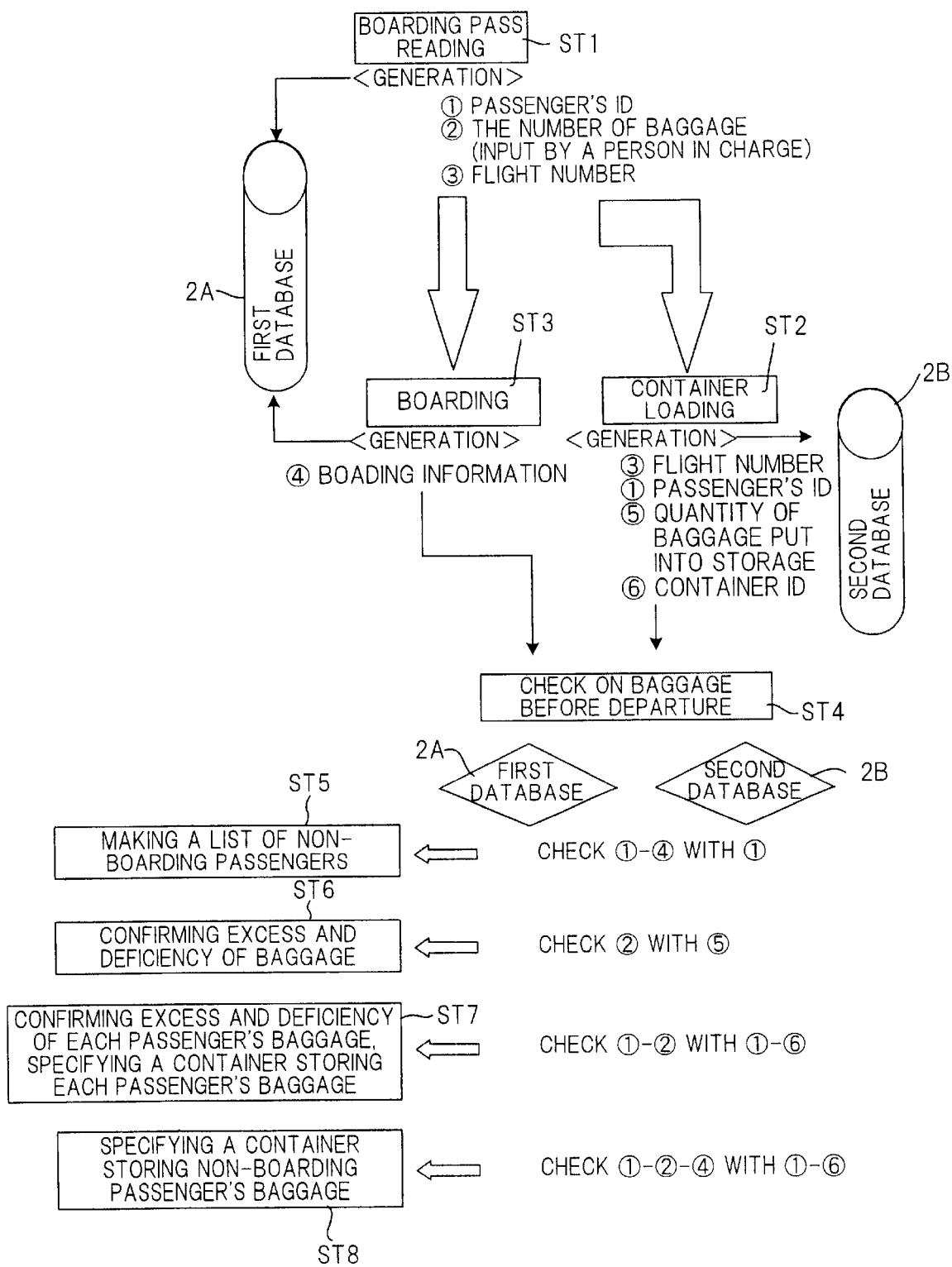

BAGGAGE MANAGING SYSTEM IN AIRPORT

FIELD OF THE INVENTION

This invention relates to a baggage managing system for handling baggage to be loaded on an airplane and, more particularly, to a baggage managing system for removing baggage of a non-boarding passenger from an airplane rapidly even if the passenger checks plural pieces of baggages and also for improving the convenience of passengers without incurring a rise in cost.

BACKGROUND OF THE INVENTION

As a conventional baggage managing system, for example, there is such a system as disclosed in Japanese Non-examined Patent Application Laid-Open No. 5-12311.

In this baggage managing system, a response circuit which has memorized baggage information showing flight number of a plane carrying baggage together with an owner of the baggage is built in a tag attached to each baggage to be loaded on the plane, and when the baggage is loaded into a container for airplane use, the baggage information which has been memorized in the response circuit is read by means of transmission and receipt of radio wave with a reading device. The baggage information read is input via a computer terminal into a host computer, while passenger's information obtained when the passenger goes on board the plane is input with a computer terminal provided at a boarding gate into the host computer. Each passenger can receive his baggage at the destination in accordance with a stub of the tag. Also, it is checked with the host computer whether the baggage information and the passenger's information which have been input therein are coincident with each other, and if there is any baggage of which no corresponding passenger is found a list of such baggage is output, and the baggage is removed from the plane.

However, in the conventional baggage managing system, there is a disadvantage in that the baggage of a non-boarding passenger may not be removed surely from the plane when the passenger checks plural pieces of baggages because the baggage information is memorized in the response circuit with a relation of one baggage to one passenger.

Also, there is a problem that an expensive built-in At radio wave oscillator is required for the tag attached to each of the baggage so that the cost rises.

There is another problem that the system is lacking in the convenience of a passenger since the passenger must be careful not to lose a stub of the tag in addition to a boarding pass.

SUMMARY OF THE INVENTION

Accordingly, it is an object of the invention to provide a baggage managing system which makes it possible to remove rapidly the baggage of a non-boarding passenger from a plane even if the passenger checks plural pieces of baggages.

It is another object of the invention to provide a baggage managing system, which makes it possible to manage the handling of baggage to be loaded on a plane without incurring a rise in costs.

It is a further object of the invention to provide a baggage managing system, which improves the convenience of passengers.

According to the invention, a baggage managing system for the handling of baggage in an airport, comprises:

means for inputting the number of baggages for a passenger;

first reading means for reading a boarding pass which has recorded boarding information including at least information identifying the passenger and flight number of an airplane carrying the baggage;

means for generating information identifying baggage which shows that the passenger is the owner in accordance with the number of baggages and the boarding information;

means for issuing a tag which has recorded the baggage identifying information;

second reading means for reading the baggage identifying information from the tag attached to the baggage and information identifying container of a container when the baggage is loaded into the container;

third reading means for reading the boarding information from the boarding pass when the passenger goes on board the airplane; and means for checking the passenger who has boarded the airplane with the baggage which has been loaded in the container in accordance with the results of reading by the first, the second and the third reading means.

According to the above-described structure, baggage identifying information corresponding to the number of baggages checked by a passenger is generated and the tag which has recorded the baggage identifying information is attached to the baggage, so that the baggage to be loaded on the plane is managed exactly even if the passenger checks plural pieces of baggages.

BRIEF DESCRIPTION OF THE DRAWINGS

The invention will be described in more detail in conjunction with the appended drawings, wherein;

FIG. 4 is a flow chart showing the operation of the baggage managing system in the embodiment.

DETAILED DESCRIPTION OF THE PREFERRED EMBODIMENT

Figure 1:
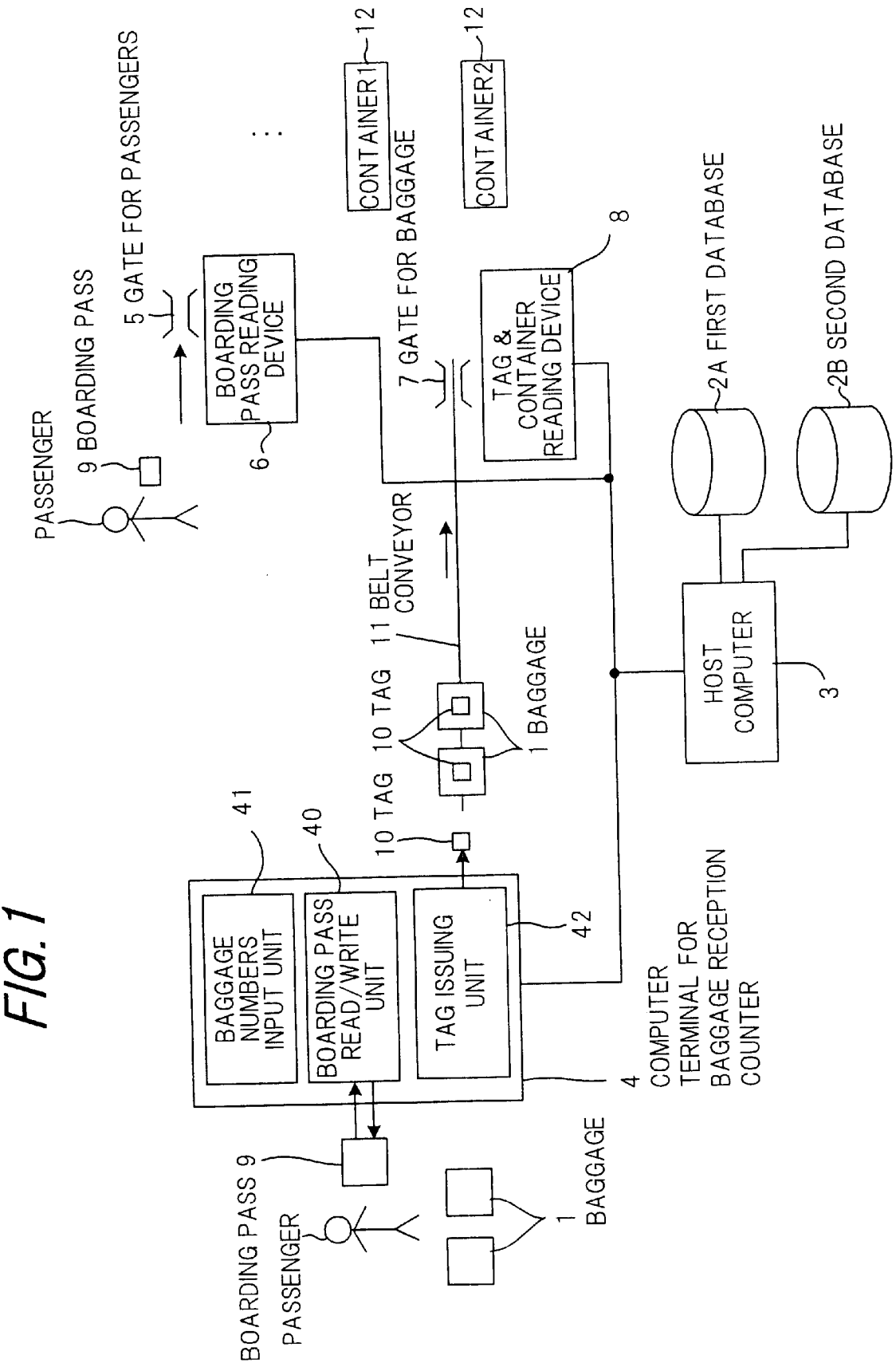
FIG. 1 is a block diagram showing a baggage managing system embodying the invention.

Referring now to the drawings an embodiment of the invention will be explained in detail. FIG. 1 shows a baggage managing system embodying the invention. The baggage managing system comprises a host computer 3 with a first and a second databases 2A and 2B which controls management of baggage 1. To this host computer 3, a computer terminal 4 positioned at a baggage reception counter, a boarding pass reading device 6 which is positioned at a gate for passengers 5 and reads boarding information from a boarding pass 9 automatically, for example, by means of magnetic reading, and a tag and container reading device 8 positioned at a gate for baggage 7 are connected, respectively.

The computer terminal for the reception counter 4 comprises a boarding pass read/write unit 40 which reads the boarding information magnetically by a magnetic head not shown and also prints out in characters baggage ID (Identifying information) and writes in bar code flight number and the baggage ID onto the boarding pass 9, a baggage numbers input unit 41 such as ten key with which the number of baggages 1 checked by a passenger P is input, and a tag issuing unit 42 which issues a tag 10 attached to the baggage 1.

Figure 2:
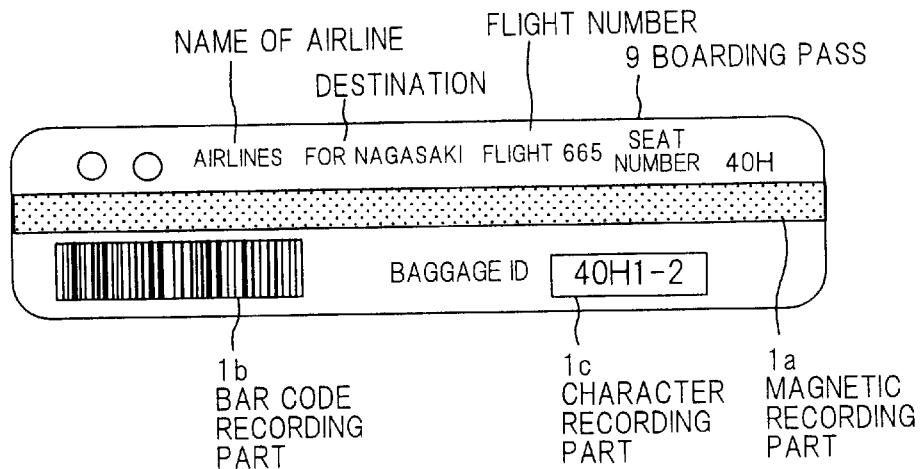
FIG. 2 is an illustrative drawing showing a boarding pass used in the embodiment.

FIG. 2 shows the boarding pass 9. The boarding pass 9 comprises a magnetic recording part 1a, a bar code recording part 1b and a character recording part 1c. In the magnetic recording part 1a, the boarding information including passenger's ID, date of boarding, flight number, destination, course (via), seat number etc. is recorded magnetically. The bar code recording part 1b is designed to write in bar code passenger's ID, flight number and baggage ID, while the character recording part 1c is designed to write baggage ID. The baggage ID consists of a seat number and a figure which corresponds to the number of baggages and being added to the subordinate position to the seat number. For example, when the seat number is "40H", if the number of baggages is 1 piece the baggage ID becomes "40H1", and if the number of baggages 1 is N pieces (N is an integral number not less than 2) the baggage ID becomes "40H1-N".

Figure 3A:
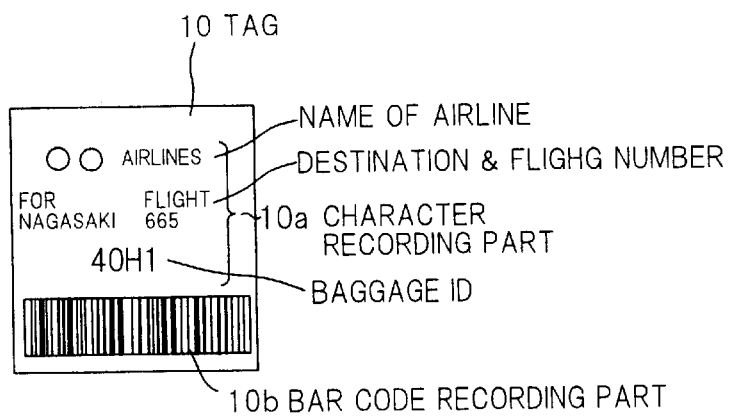
FIG. 3A and FIG. 3B are illustrative drawings showing tags used in the embodiment.
Figure 3B:
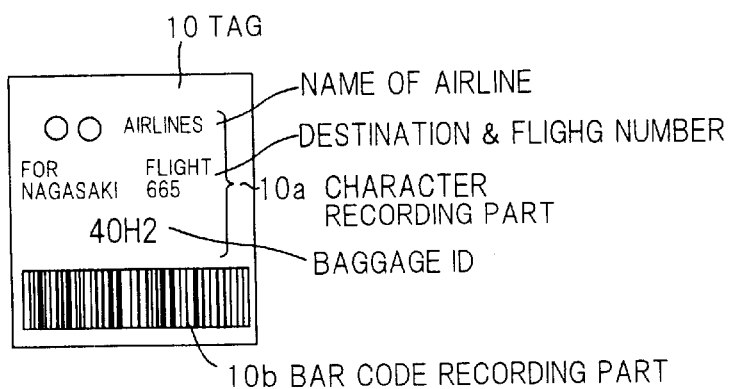

FIGS. 3A and 3B show the tags 10, respectively. The tag 10 comprises a character input part 10a and a bar code recording part 10b. The character input part 10a is designed to write in letters flight number and baggage ID, while the bar code recording part 10b is designed to write in bar code passenger's ID, flight number and baggage ID. The baggage ID consists of a seat number and a figure to follow it which shows the number of baggages 1. For example, when the baggage 1 is two pieces, a tag 10 as shown in FIG. 3A whose baggage ID is "40H1" and a tag 10 as shown in FIG. 3B whose baggage ID is "40H2" are issued by the tag issuing unit 42.

The tag and container reading device 8 reads with a bar code reader not shown the container ID recorded in bar code on the bar code recording part 10b of the tag 10 and the container ID given in bar code to the container 12.

Next, the operation of the baggage managing system will be explained. A passenger P exchanges an air ticket for a boarding pass 9 and thereafter checks baggage 1 together with the boarding pass 9 at a baggage reception counter. A person in charge of the baggage reception counter accepts the baggage 1, operating a computer terminal for the counter 4. That is to say, when the person in charge, operating the baggage numbers input unit 41, inputs the number of baggages 1 checked by the passenger P, the boarding pass read/write unit 40 reads magnetically the boarding information from the magnetic recording part 1a of the boarding pass 9, and it also generates baggage ID in accordance with the seat number in the boarding information and the number of baggages, writes in letters the baggage ID onto the character recording part 1c, and writes in bar code the passenger's ID, flight number and the baggage ID onto the bar code recording part 1b of the boarding pass 9. The tag issuing unit 42 issues a tag 10 having the character recording part 10a on which the flight number and the baggage ID have been written in letters and the bar code recording part 10b on which the passenger's ID, the flight number and the baggage ID have been written in bar code. In this unit, the tags 10 whose number being equal to that of the baggage 1 checked are issued. The computer terminal for reception counter 4 sends information such as the passenger's ID, the number of baggages and the flight number to the host computer 3. The host computer 3 records the passenger's ID, the number of baggages and the flight number in the first database 2A (STEP 1).

Next, the person in charge of the baggage reception counter attaches the tags 10 to each of the baggage 1 and lays the baggage on a belt conveyor for baggage transportation 11. When each of the baggage 1 transported by the conveyor 11 passes the gate for baggage 7, the tag and container reading device 8 reads with a bar code reader the passenger's ID, the flight number and the baggage ID from the tag 10 attached to the baggage 1 together with the container ID given to the container 12, and sends the passenger's ID, the flight number and the baggage ID which it has read to the host computer 3. The host computer 3 knows the number of baggages having been put into storage from the baggage ID and records the number thereof and the passenger's ID, the flight number and the container ID in the second database 2B (STEP 2).

On the other hand, when the passenger P passes the gate for passengers 5, the boarding pass 9 is read by the boarding pass reading device 6. The boarding pass reading device 6 sends the boarding information which it has read magnetically from the magnetic reading part 1a of the boarding pass 9 to the host computer 3. The host computer 3 records the boarding information showing that the passenger P went on board the plane in the first database 2A (STEP 3).

Next, the host computer 3 confirms the baggage 1 before the plane leaves (STEP 4). That is to say, the host computer 3 makes a list of passengers who did not board the plane (non-boarding passengers) in accordance with the passenger's ID and the boarding information recorded in the first database 2A and the passenger's ID in the second database 2B (STEP 5). Next, it confirms the excess and deficiency of the baggage from the number of baggages in the first database 2A and the number of the baggages put into storage recorded in the second database 2B (STEP 6).

Next, it specifies every passenger P the excess and deficiency of the baggage 1 and the container 12 storing the baggage 1 from the passenger's ID in the first database 2A and the passenger's ID and the container ID in the second database 2B (STEP 7).

Next, it specifies the container 12 storing the baggage 1 of the non-boarding passengers from the passenger's ID, the number of baggages and the boarding information in the first database 2A together with the passenger's ID and the container ID in the second database 2B (STEP 8). The person in charge takes out the baggage 1 of the non-boarding passengers from the specified container 12.

Thereafter, when the plane carrying the passengers P and the baggage 1 departs and arrives at the destination, each passenger at that place, checking the baggage ID recorded in characters on the boarding pass 9 with the baggage ID on the tag 10 attached to the baggage 1, finds and takes the baggage of his own from many pieces of baggages unloaded from the container 12. For example, if the seat number is "40H" and the number of baggages is two pieces, the baggage ID written on the boarding pass 9 becomes "40H2". In this case, the passenger receives two pieces of baggages 1 with the tags 10 on which the baggage ID "40H1" and "40H2" are recorded, respectively.

According to the baggage managing system in the above embodiment, baggage ID corresponding to the number of the baggages 1 checked by a passenger P is generated and the tag which has recorded the baggage ID is attached to the baggage 1, so that the baggage 1 of a non-boarding passenger is removed rapidly from the plane, even if the passenger P checks plural pieces of baggages 1. In addition, since reading of the baggage ID is conducted using bar code, the system may keep the cost from rising.

Also, since the passenger's ID, the flight number and the baggage ID are recorded on the tag 10 in bar code, expensive radio wave oscillators become unnecessary and the tag 10 may be produced at low cost, and consequently cost of the whole system may be prevented from rising. Also, since the baggage ID is recorded on the boarding pass 9 and the baggage 1 can be searched without a stub of tag 10, the convenience of passengers may be improved. Also, since the tag 10 needs not have a sewing machine mesh, it may be produced at low cost.

Besides, in the above embodiment, the tag and container reading device reads necessary information with a bar code reader, but reading by other optical method or magnetic method may be adopted. Also, the container ID may be perceived otherwise in such a way as to receive a radio wave showing the container ID from an oscillator to be provided on the container 12. Also, the boarding pass reading device 6 may read with a bar code reader the boarding information from the bar code recording part 1*b* of the boarding pass 9 or read the boarding information by other optical method.

As explained above, according to a baggage managing system embodying the invention, baggage identifying information corresponding to the number of baggages checked by a passenger is generated and a tag which has recorded the baggage identifying information is attached to the baggage, so that it becomes possible to remove rapidly the baggage of a non-boarding passenger from a plane, even if the passenger checks plural pieces of baggages.

Also, since the baggage identifying information on the tag is recorded in bar code and consequently an expensive radio wave oscillator becomes unnecessary, the tag may be produced at a low price and a rise in cost may be prevented.

Also, since the baggage identifying information is recorded on the boarding pass and the passenger can search for his baggage without having a stub of the tag, the convenience of passengers may be improved.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A baggage managing system for the handling of baggage in an airport, the managing system comprising:
    means for inputting the number of baggages for a passenger;
    first reading means for reading a boarding pass which has recorded boarding information including at least information identifying the passenger and flight number of an airplane carrying the baggage;
    means for generating information identifying baggage which shows that the passenger is the owner in accordance with the number of baggages and the boarding information;
    means for issuing a tag which has recorded the baggage identifying information;
    second reading means for reading the baggage identifying information from the tag attached to the baggage and information identifying container of a container when the baggage is loaded into the container;
    third reading means for reading the boarding information from the boarding pass when the passenger goes on board the airplane; and
    means for checking the passenger who has boarded the airplane with the baggage which has been loaded in the container in accordance with the results of reading by the first, the second and the third reading means.

2. The baggage managing system for the handling of baggage in an airport, according to claim 1, wherein:
    the checking means has a structure to specify a passenger who has not boarded the airplane and also to specify the container identifying information of the container in which the baggage of the non-boarding passenger is loaded.

3. The baggage managing system for the handling of baggage in an airport, according to claim 1, wherein:
    the tag issuing means has a structure to record in bar code the baggage identifying information on the tag.

4. The baggage managing system for the handling of baggage in an airport, according to claim 1, wherein:
    the first reading means has a structure to record the baggage identifying information on the boarding pass.

5. A system for managing checked bags for a passenger of an airline flight, comprising:
    a boarding pass having (i) flight information identifying an airline flight, (ii) passenger information identifying a passenger of the airline flight, and (iii) first checked baggage information including a number of bags checked by the passenger for the airline flight; and
    a respective baggage tag associated with each of the checked bags having (I) the flight information, (ii) the passenger information, and (iii) second checked baggage information including a number of that checked bag;
    wherein a total number of baggage tags associated with all of the checked bags is equal to the number of checked bags included in the first checked baggage information.

6. The system according to claim 5, wherein:
    the boarding pass has the flight information, the passenger information and the first checked baggage information included in human readable and in machine readable form; and
    the baggage tag associated with each of the checked bags has the flight information, the passenger information and the second checked baggage information included in human readable and in machine readable form.

7. The system according to claim 6, wherein:
    the machine readable flight information, passenger information and first checked baggage information is included in the boarding pass as one of magnetically stored data and a printed bar code; and
    the machine readable flight information, passenger information and second checked baggage information is included in the baggage tag as a printed bar code.

8. The system according to claim 5, wherein:
    the passenger information and the first checked baggage information are represented by a series of adjacent characters; and
    the passenger information and the second checked baggage information are represented by a series of adjacent characters.

9. The system according to claim 5, wherein the passenger information includes a seat number.

10. A system for managing checked bags for a passenger of an airline flight, comprising:
    a first terminal configured to read a boarding pass having (i) flight information identifying an airline flight, (ii) passenger information identifying a passenger of the airline flight, and (iii) first checked baggage information including a number of bags checked by the passenger for the airline flight;
    a second terminal configured to read a respective baggage tag located with each of the checked bags having (i) the flight information, (ii) the passenger information, and (iii) second checked baggage information including a number of that checked bag; and a computing device configured to determine if the number of checked bags included in the first checked baggage information of the read boarding pass corresponds to the numbers of the checked bags included in the second checked baggage information of the read baggage tags.

11. The system according to claim 10, further comprising:

a third terminal configured (i) to write the first checked baggage information on the boarding pass, and to transmit the flight information, the passenger information, and the written first checked baggage information to the computing device, and (ii) to write the flight information, the passenger information, and the second checked baggage information on each of the baggage tags;

wherein the first terminal is further configured to transmit the flight information the passenger information, and the first checked baggage information read from the boarding pass to the computing device;

wherein the second terminal is further configured to transmit the flight information, the passenger information, and the second checked baggage information read from the baggage tag located with each of the checked bags to the computing device;

wherein the computing device is further configured to store (i) the flight information, passenger information, and first checked baggage information transmitted by the third terminal, in a first database, (ii) an indication that the passenger has boarded the airline flight based on the flight information, passenger information, and first checked baggage information transmitted by the first terminal, in a first database, and (iii) the flight information, passenger information, and second checked baggage information transmitted by the second terminal in a second database;

wherein the computing device is further configured to determine if the number of checked bags included in the first checked baggage information corresponds to the numbers of the checked bags included in the second checked baggage information by comparing the flight information, passenger information, and first checked baggage information stored in the first database with the flight information, passenger information, and second checked baggage information stored in the second database.

12. The system according to claim 11, wherein the computing device is further configured to compare (i) the flight information, passenger information, and first checked baggage information stored in the first database, with (ii) the flight information, passenger information, and second checked baggage information stored in the second database, responsive to receipt of the flight information, passenger information, and first checked baggage information transmitted by the first terminal.

13. The system according to claim 11, wherein the computing device is further configured to identify any determined non-correspondence.

14. The system according to claim 11, wherein:

the third terminal is further configured (i) to write third checked baggage information, including a number of other bags checked by another passenger for the airline flight, on another boarding pass having the flight information and other passenger information identifying the other passenger of the airline flight, and to transmit the flight information, the other passenger information, and the written third checked baggage information to the computing device, and (ii) to write, on a respective other baggage tag to be located with each of the other checked bags, the flight information, the other passenger information, and fourth checked baggage information, including a number of that other checked bag;

the second terminal is further configured (i) to read the flight information, the other passenger information, and the fourth checked baggage information from the other baggage tag located with each of the other checked bags, and (ii) to transmit the read flight information, other passenger information, and fourth checked baggage information to the computing device; and the computing device is further configured (i) to store the flight information, other passenger information, and third checked baggage information transmitted by the third terminal, in the first database, (ii) to store the flight information, other passenger information, and fourth checked baggage information transmitted by the second terminal in the second database, (iii) to determine that the other passenger has not boarded the airline flight based a failure of first terminal to transmit the flight information, the other passenger information, and third checked baggage information to the computing device, and (iv) to identify the other checked bags based on the numbers of the other checked bags included in the fourth checked baggage information stored in the second database, responsive to the determination that the other passenger has not boarded the airline flight.

15. The system according to claim 14, wherein the computing device is further configured to identify the other passenger as a non-boarded passenger based on the determination that the other passenger has not boarded the airline flight.

16. A method for managing checked bags for a passenger of an airline flight, comprising:

reading a boarding pass having (i) flight information identifying an airline flight, (ii) passenger information identifying a passenger of the airline flight, and (iii) first checked baggage information including a number of bags checked by the passenger for the airline flight;

reading a respective baggage tag located with each of the checked bags having (i) the flight information, (ii) the passenger information, and (iii) second checked baggage information including a number of that checked bag; and determining if the number of checked bags included in the first checked baggage information of the read boarding pass corresponds to the numbers of the checked bags included in the second checked baggage information of the read baggage tags.

17. The method according to claim 16, further comprising:

storing the flight information, the passenger information, and the first checked baggage information in a first database;

storing the flight information, the passenger information, and the second checked baggage information from the read baggage tags in a second database; and storing an indication that the passenger has boarded the airline flight in a first database, based on the flight information, the passenger information, and the first checked baggage information on the read boarding pass;

wherein correspondence of the number of checked bags included in the first checked baggage information to the numbers of the checked bags included in the second checked baggage information is determined by comparing the flight information, passenger information, and first checked baggage information stored in the first database with the flight information, passenger information, and second checked baggage information stored in the second database.

18. The method according to claim 17, wherein the flight information, passenger information, and first checked baggage information stored in the first database is compared with the flight information, passenger information, and second checked baggage information stored in the second database based on the reading of the boarding pass.

19. The method according to claim 17, further comprising:

identifying a determined non-correspondence.

20. The method according to claim 17, further comprising:

storing the flight information, other passenger information identifying another passenger of the airline flight, and third checked baggage information, including a number of other bags checked by the other passenger for the airline flight, in the first database;

reading a respective other baggage tag located with each of the other checked bags, having (i) the flight information, (ii) the other passenger information, and (iii) fourth checked baggage information, including a number of that other checked bag;

storing the flight information, the other passenger information, and the fourth checked baggage information read from the other baggage tag located with each of the other checked bags, in the second database;

determining that the other passenger has not boarded the airline flight based a failure to read a boarding pass having the flight information, the other passenger information, and third checked baggage information; and identifying the other checked bags based on the numbers of the other checked bags included in the fourth checked baggage information stored in the second database, responsive to the determination that the other passenger has not boarded the airline flight.

21. The method according to claim 20, further comprising:

identifying the other passenger as a non-boarded passenger based on the determination that the other passenger has not boarded the airline flight.

* * * * *